United States Patent
Ogo

[11] Patent Number: 6,069,618
[45] Date of Patent: May 30, 2000

[54] DATA PROCESSING DEVICE AND METHOD FOR PROCESSING DATA

[75] Inventor: Kenji Ogo, Tenri, Japan

[73] Assignee: Sharp Kabushiki Kaisha, Osaka, Japan

[21] Appl. No.: 08/893,981

[22] Filed: Jul. 16, 1997

[30] Foreign Application Priority Data

Jul. 26, 1996 [JP] Japan .................................. 8-197428

[51] Int. Cl.[7] ............................................. G09G 5/00
[52] U.S. Cl. ...................... 345/173; 345/179; 345/168; 345/169; 345/172
[58] Field of Search ........................... 345/173, 179, 345/168, 169, 172, 178; 178/18.1

[56] References Cited

U.S. PATENT DOCUMENTS

| | | | |
|---|---|---|---|
| 4,802,104 | 1/1989 | Ogiso ................................... | 707/517 |
| 4,808,987 | 2/1989 | Takeda et al. ........................ | 345/115 |
| 5,539,427 | 7/1996 | Bricklin ................................ | 345/118 |
| 5,691,748 | 11/1997 | Fukuzaki ............................. | 345/173 |
| 5,724,069 | 3/1998 | Chen ................................... | 345/172 |
| 5,732,229 | 3/1998 | Dickinson ........................... | 395/334 |
| 5,761,688 | 6/1998 | Morishita ............................ | 707/532 |
| 5,778,404 | 7/1998 | Capps et al. ........................ | 707/531 |
| 5,798,750 | 8/1998 | Ozaki ................................... | 345/126 |
| 5,812,118 | 9/1998 | Shieh ................................... | 345/173 |
| 5,821,930 | 9/1998 | Hansen ................................ | 345/340 |

FOREIGN PATENT DOCUMENTS 2-96870  4/1990  Japan .

OTHER PUBLICATIONS

Anonymous, "Visual, Interactive Clipboard Function", IBM Technical Disclosure Bulletin, vol. 35, No. 4B, XP–002100974, Sep. 1992, pp. 94–95.

Patent Abstract of Japan, vol. 017, No. 207 (P–1525), Apr. 22, 1993 and JP 4–34777, Dec. 2, 1992.

Patent Abstract of Japan, vol. 017, No. 258 (P–1540), May 20, 1993 and JP 4–373015, Dec. 25, 1992.

*Primary Examiner*—William A. Cuchlinski, Jr.
*Assistant Examiner*—Marthe Y Marc-Coleman
*Attorney, Agent, or Firm*—Nixon & Vanderhye, P.C.

[57] ABSTRACT

A data processing device includes a display section for displaying input data; a selection section for selecting at least a portion of the input data displayed by the display section; a generation section for generating index data based on at least a portion of the selected input data; and a storage section for storing the selected input data and the index data. The display section further displays at least a portion of the index data as a search key for effecting the input data to be displayed on the display section.

9 Claims, 7 Drawing Sheets

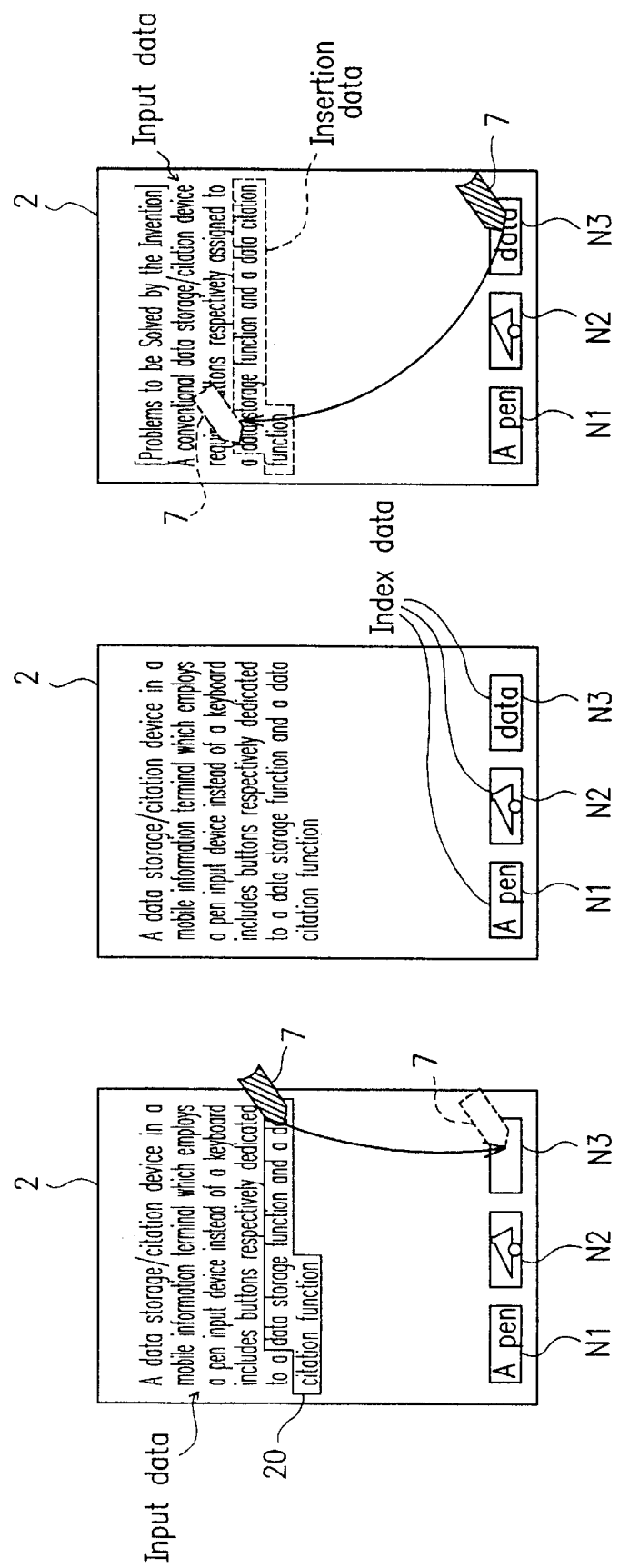

DATA PROCESSING DEVICE AND METHOD FOR PROCESSING DATA

BACKGROUND OF THE INVENTION

1. Field of the Invention

The present invention relates to a data processing device suitable for use in an information terminal device which allows operations with a touch pen, e.g., an electronic scheduler or a word processor.

2. Description of the Related Art

Japanese Laid-Open Patent Publication No.2-96870 discloses reading citation text data from a magnetic disk, a floppy disk, or a tape recorder to a display memory, and selectively displaying one of the contents stored in the display memory.

SUMMARY OF THE INVENTION

A data processing device according to the present invention includes: a display section for displaying input data; a selection section for selecting at least a portion of the input data displayed by the display section; a generation section for generating index data based on at least a portion of the selected input data; and a storage section for storing the selected input data and the index data. The display section further displays at least a portion of the index data as a search key for effecting the input data to be displayed on the display section.

In one embodiment of the invention, the display section displays a function key having a region, the index data being displayed within the region.

In another embodiment of the invention, the input data is text data including numbers and letters.

In still another embodiment of the invention, the text data includes a string of letters, the index data being a first letter to a predetermined letter of the string of letters.

In still another embodiment of the invention, the input data is image data including figures and/or diagrams.

In still another embodiment of the invention, the index data is obtained by subjecting the image data to data compression.

Alternatively, a data processing device according to the present invention includes: a display section for displaying input data; a touch pen operative to select a function from the display section; a tablet disposed on the display section, the tablet operative to detect coordinates corresponding to a position of the touch pen relative to the display section; a storage section for storing a portion of the input data, the portion of the input data being designated by the touch pen; and a generation section for generating index data based on the designated portion of the input data, the index data being used for effecting the designated portion of the input data to be read from the storage section and displayed on the display section. The display section displays a key having a region, the index data being displayed within the region, and the designated portion of the input data corresponding to the key is displayed at a predetermined position on the display section when the key is selected by the touch pen.

In one embodiment of the invention, the input data includes text data including numbers and letters and image data including figures and diagrams.

A method for processing data according to the present invention includes: a step of displaying input data in a display region of a display section; a step of displaying a plurality of keys as indices for selecting at least a portion of the input data to be cited, the plurality of keys being displayed in a region other than the display region of the display section; a first determination step for determining whether or not any region of the input data displayed by the display section is designated to be registered; a second determination step for determining, in the case where it is determined in the first determination step that a region is designated, whether or not any of the plurality of keys displayed by the display section is designated as a key corresponding to the input data; a step of storing, in the case where it is determined in the second determination step that one of the plurality of keys displayed by the display section is designated as a key corresponding to the input data, position data indicating a position of the designated key as associated with registered data displayed in the designated region; a step of generating index data based on the registered data stored in the storage section; a step of displaying the index data within a frame representing the key corresponding to the input data; a third determination step for determining whether or not any of the plurality of keys displayed by the display section is designated to be cited; a fourth determination step for determining, in the case where it is determined in the third determination step that one of the plurality of keys is designated, determining whether or not a position for citing the registered data is designated within the display region of the display section; and a step of inserting, in the case where it is determined in the fourth determination step that a position for citing the registered data is designated, the registered data at the designated position.

In one embodiment of the invention, the method further includes a fifth determination step of determining whether or not one of the plurality of keys and a position for citing the registered data are designated by a user while touching the display section after the third determination step is finished and before the fourth determination step is begun.

In another embodiment of the invention, the input data includes text data including numbers and letters and image data including figures and diagrams.

Thus, the invention described herein makes possible the advantages of providing a data processing device which allows a user to designate a region of input data to be registered, the content of the registered data being easily grasped by the user based on keys displayed on a display section along with input data, so that the user can cite or incorporate the registered data at a different position of the input data.

These and other advantages of the present invention will become apparent to those skilled in the art upon reading and understanding the following detailed description with reference to the accompanying figures.

BRIEF DESCRIPTION OF THE DRAWINGS

FIG. 4A is a view showing a text displayed by a data processing device according to an example of the present invention.

FIG. 4B is a view showing a text displayed by a data processing device according to an example of the present invention.

FIG. 4C is a view showing a text displayed by a data processing device according to an example of the present invention.

DESCRIPTION OF THE PREFERRED EMBODIMENTS

Figure 1:
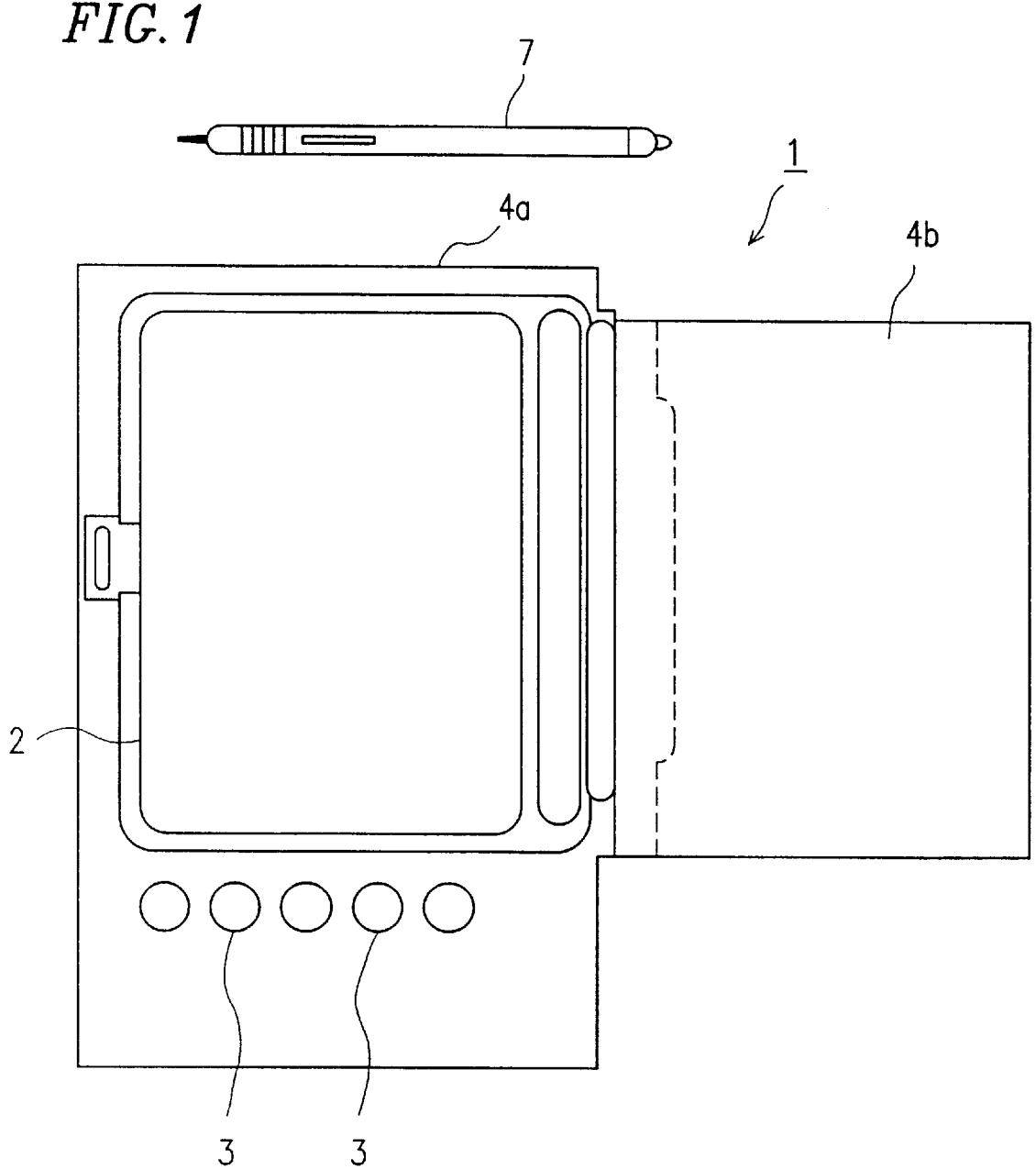
FIG. 1 is a plan view illustrating the outlook of a data processing device according to an example of the present invention.

Hereinafter, the data processing device according to the present invention will be described with reference to FIG. 1. FIG. 1 shows the outline of the data processing device 1 according to the present invention.

The data processing device 1 in FIG. 1 includes an input/output section 2 for performing input/output functions, a plurality of keys 3, and a body 4a. In the case where the data processing device of the present invention is an electronic scheduler, as shown in FIG. 1, the data processing device may further include a front lid 4b. The front lid 4b is hinged to the body 4a and thus capable of freely moving.

Figure 2:
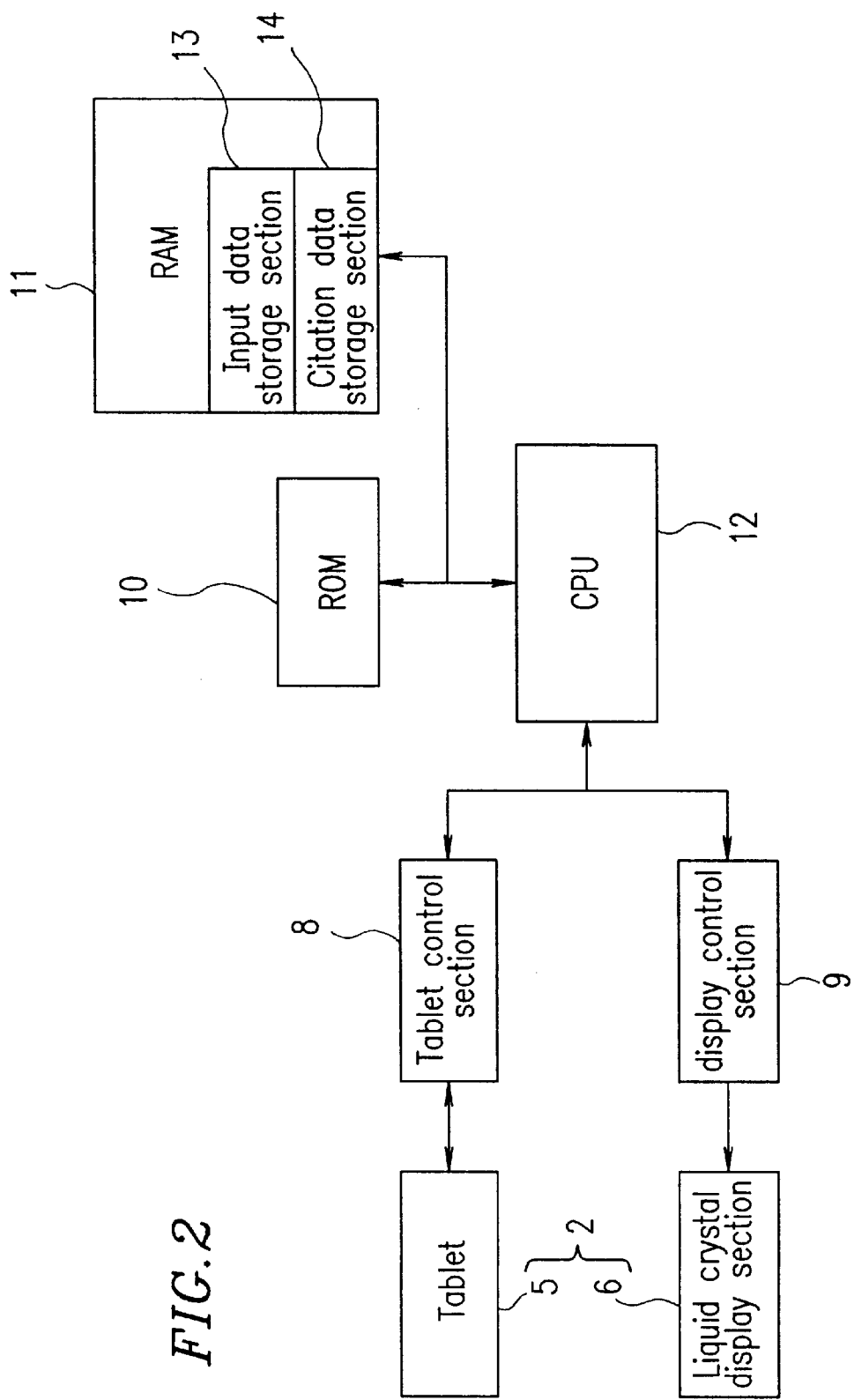
FIG. 2 is a block diagram illustrating the configuration of a data processing device according to an example of the present invention.

As shown in FIG. 2, the input/output section 2 includes a tablet 5 and a liquid crystal display section 6. The tablet 5 is disposed so as to cover the liquid crystal display section 6. A backlight (not shown) may be provided at the back of the liquid crystal display section 6.

A user may use a touch pen 7 (as shown in FIG. 1) to select one of various functions or operations or to input text data, e.g., numbers and letters, and image data, e.g., figures and diagrams by touching the tablet 5 with the touch pen 7.

The liquid crystal display section 6 is capable of displaying text data and image data.

Hereinafter, the data processing device 1 in FIG. 1 will be described in detail with reference to FIG. 2.

The data processing device 1 includes an input/output section 2 (including the tablet 5 and the liquid crystal display section 6), a tablet control section 8, a display control section 9, a ROM 10, a CPU 12, and a RAM 11.

The tablet control section 8 outputs coordinates indicating a position on the tablet 5 touched with the touch pen 7 to the CPU 12.

The display control section 9 causes the display section 6 to display text data and image data.

The ROM 10 stores at least a plurality of programs for performing various functions (data inputting functions, data citation functions, etc.), image data, and fonts for displaying text data.

The RAM 11 includes an input data storage section 13 and a citation data storage section 14. The input data storage section 13 stores input text data and image data as part of the data input functions. The citation data storage section 14 stores necessary text data and image data as part of the data citation functions. Furthermore, the citation data storage section 14 stores the shape data of keys N1 to N3 displayed on the display section 6 shown in FIGS. 4A, 4B and 4C. The keys N1 to N3 serve as indices for a user searching for the desired registered data to cite, or incorporate, into another position of the data stored in the data processing device.

Figure 3:
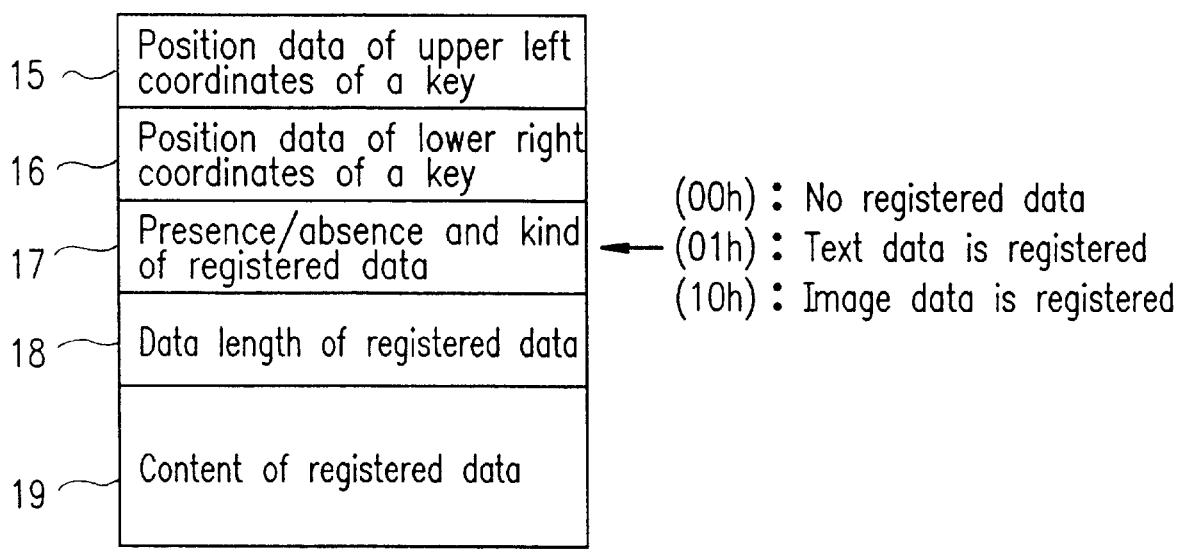
FIG. 3 is a diagram illustrating the structure of a citation data storage section of a RAM according to the present invention.

The citation data storage section 14 of the RAM 11 includes a number of sets of areas 15 to 19 (as shown in FIG. 3), each one of the keys N1 to N3 having a corresponding set of areas 15 to 19 dedicated thereto (so that there are as many sets of areas 15 to 19 as there are keys). The areas 15 and 16 store position data, respectively, e.g. position data of the upper left corresponding to one of the keys N1 to N3 and position data of the lower left corresponding to the one of the keys N1 to N3. The area 17 stores information indicating the presence or absence of citation data for display within a corresponding one of the keys N1 to N3 and/or information indicating whether the content of the registered data is text data or image data. The area 18 stores the data length of the registered data in a corresponding one of the keys N1 to N3. The area 19 stores the registered data in a corresponding one of the keys N1 to N3.

The position data of the keys N1 to N3 according to the present example is expressed as coordinates with respect to an original point defined by the upper left corner of the liquid crystal display section 6. In the case where each key N1 to N3 has a rectangular shape as shown in FIGS. 4A, 4B and 4C, the coordinates of two diagonal apices, e.g., the upper left corner and the lower right corner, may be stored as position data in the areas 15 and 16, respectively.

The area 17 stores information (e.g., 00h) indicating that no registered data is present, information (e.g., 01h) indicating that text data is stored as registered data, information (e.g., 10h) indicating that image data is stored as registered data, or the like.

Figure 6:
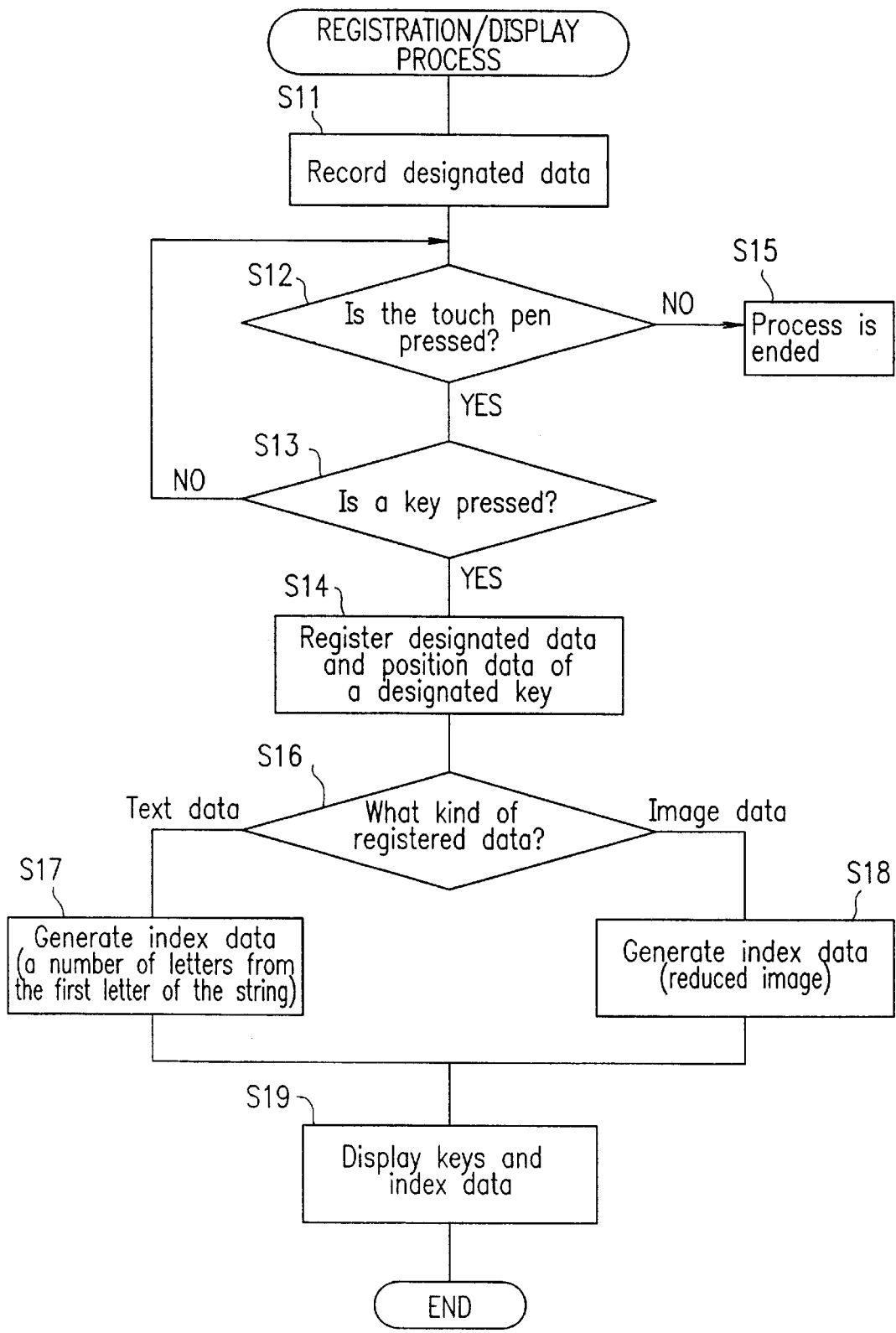
FIG. 6 is a flowchart illustrating an operation for registering data.
Figure 7:
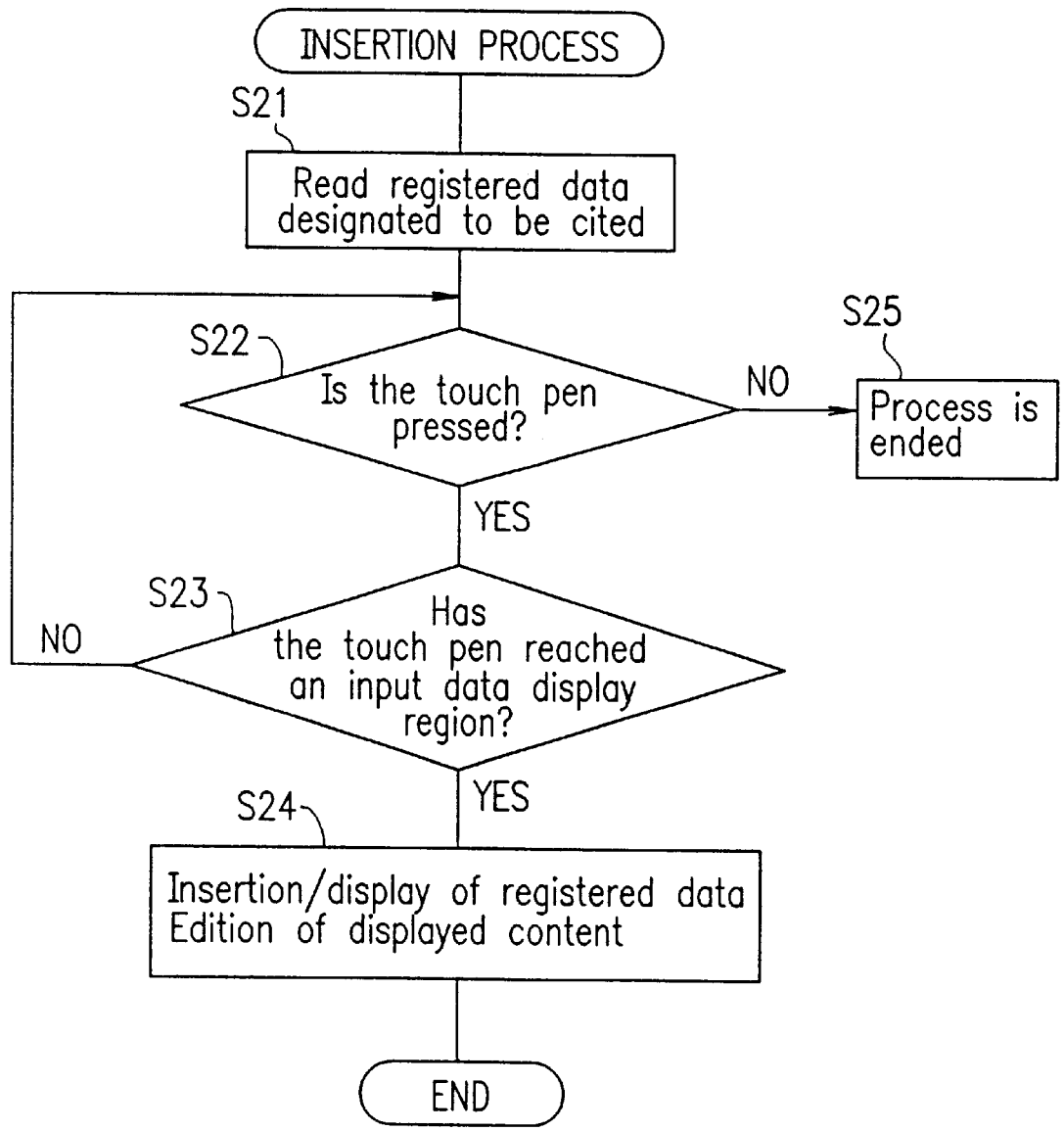
FIG. 7 is a flowchart illustrating an operation for citing registered data.

The CPU 12 controls the inputting and outputting, respectively, of input data (including various commands) and output data. Furthermore, the CPU 12 performs the data citation function as illustrated in FIGS. 6 and 7.

The data citation function includes a registration/display process and an insertion process.

In a registration/display process, the text data and/or image data displayed by the display section 6 is registered in accordance with instructions by a user. Index data is generated corresponding to and based on the registered data. The index data is displayed within the keys N1 to N3, which in turn are displayed on the liquid crystal display section 6.

In an insertion process, the registered data is inserted at a desired position in the liquid crystal display section 6 as instructed by the user.

The CPU 12 may also perform a data input function. In the data input function, character keys representing the alphabetical letters, etc. may be displayed on the display section 6 so that the user can select one or more of the letters to input by means of the tablet 5. Alternatively, the user may directly handwrite alphabetical letters, etc. on the tablet 5.

The operations of the electronic scheduler 1 will be described with reference to FIGS. 4 and 5.

FIGS. 4A, 4B, and 4C show the liquid crystal display section 6 indicating a text.

A user may designate a portion of the text displayed on the liquid crystal display section 6 (FIG. 4A) with the touch pen 7. In FIG. 4A, a region 20 (enclosed by a solid line) is shown to be designated as an object to be registered. The CPU 12 records the string of letters within the designated region 20 as registered data in the RAM 11. Thereafter, the user may touch the key N3 with the touch pen 7 to cause the designated region 20 to be displayed within the frame representing the key N3, as shown in FIG. 4B.

The user can selectively cite the registered data by pressing on one of the keys N1 to N3, e.g., N3, which is displayed on the liquid crystal display section 6 (FIG. 4C). Next, the user may instruct with the touch pen 7 a position at which the user wishes to insert the selected registered data. As a result, the registered data can be inserted at the desired position.

Figure 5C:
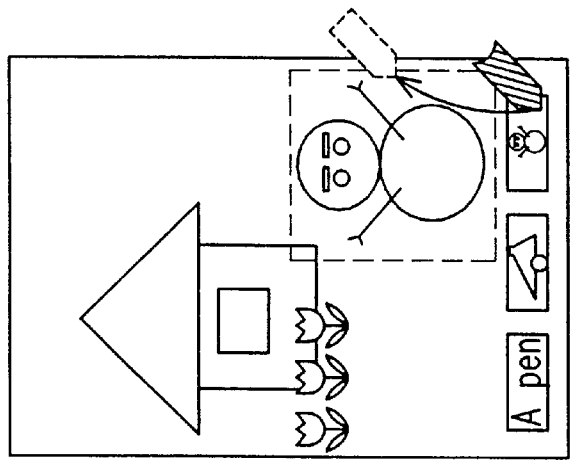
FIG. 5C is a view showing an image displayed by a data processing device according to an example of the present invention.
Figure 5B:
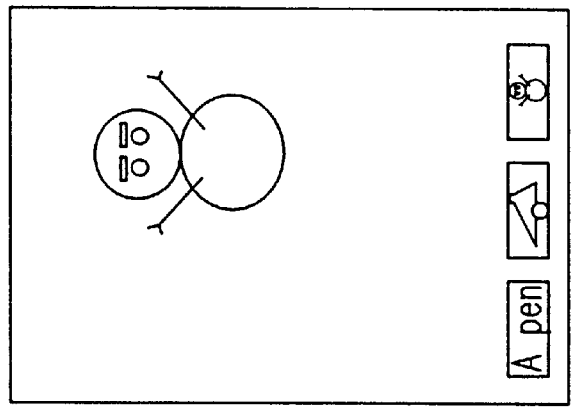
FIG. 5B is a view showing an image displayed by a data processing device according to an example of the present invention.
Figure 5A:
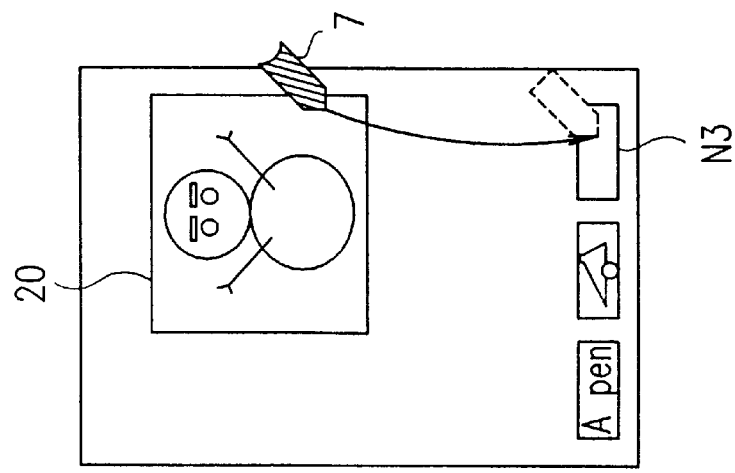
FIG. 5A is a view showing an image displayed by a data processing device according to an example of the present invention.

FIGS. 5A, 5B, and 5C represent the liquid crystal display section 6 displaying an image.

Similarly, a user may designate a portion of the image displayed on the liquid crystal display section 6 (FIG. 5A) with the touch pen 7. In FIG. 5A, a region 20 (enclosed by a solid line) is shown to be designated as an object to be registered. The CPU 12 records the image data within the designated region 20 as registered data in the RAM 11. Thereafter, the user may touch the key N3 with the touch pen 7 to cause the designated region 20 to be displayed within the frame representing the key N3, as shown in FIG. 5B.

The user can select the registered data to be cited by pressing on one of the keys N1 to N3, e.g., N3, which is displayed on the liquid crystal display section 6 (FIG. 5C). Next, the user may instruct with the touch pen 7 a position at which the user wishes to insert the selected registered data. As a result, the registered data can be inserted at the desired position.

Hereinafter, an operation of the electronic scheduler 1 for registering data will be described with reference to FIGS. 4A to 4C and FIG. 6.

The user may designate a portion, e.g., the region 20, of the text displayed on the liquid crystal display section 6 (FIG. 4A) with the touch pen 7. At step S11, the CPU 12 records the string of letters and/or an image within the designated region 20 as registered data in the RAM 11.

In the case where the registered data is a string of letters, a region such as the region 20 may be designated in either of the following manners (1) and (2):

(1) continuously pressing down the touch pen 7 from the first letter to the last letter in the string of letters to be registered; or
(2) pressing down the touch pen 7 at two points, i.e., the first letter and the last letter in the string of letters to be registered.

In this case, the CPU 12 recognizes the region 20 based on the above operation (1) or (2).

Then, the user may move the touch pen 7, while continuously pressing it down, from the designated region 20 toward one of the keys N1 to N3, and finally release the pressure on the touch pen 7 when it has reached the desired one of the keys N1 to N3. The CPU 12 confirms if this operation has been performed at steps S12 and S13.

At step S12, the CPU 12 determines whether the touch pen 7 is in contact with the liquid crystal display section 6 or not. If the touch pen 7 is in contact with the liquid crystal display section 6, the control proceeds to step S13. If the touch pen 7 is not in contact with the liquid crystal display section 6, the control proceeds to step S15, thereby ending the control. At any time after the control is ended, the user may resume the control at step S12 to assign the content of the already designated region 20 to one of the keys N1 to N3.

At step S13, the CPU 12 determines which key the touch pen 7 is in contact with. For example, the CPU 12 may determine whether or not the touch pen 7 is in contact with one of the keys N1 to N3; if the touch pen 7 is in contact with the key, the control proceeds to step S14; if the touch pen 7 is not in contact with one of the key, it is determined whether or not the touch pen 7 is in contact with another key. This determination process can be repeated until (i) it is determined that the touch pen 7 is in contact with one of the keys N1 to N3 (then the control proceeds to step S14), or (ii) it is determined that the touch pen 7 is not in contact with any of the keys N1 to N3 (then the control proceeds to step S12).

At step S14, the CPU 12 registers in the citation data storage section 14 the data of a string of letters and/or image within the region 20 designated at step S11, as well as the position information of the key with which the touch pen 7 is in contact.

At step S16, it is determined whether the registered data stored in the citation data storage section 14 is text data or image data. If the registered data stored in the citation data storage section 14 is text data, the process proceeds to step S17. If the registered data stored in the citation data storage section 14 is image data, the process proceeds to step S18.

At step S17, the CPU 12 generates index data. The index data in this case includes a portion of the registered string of letters, e.g., a number of consecutive letters from the first letter of the string.

At step S18, the CPU 12 generates index data. The index data in this case may be a reduced image of the entire image data.

At step S19, the CPU 12 causes the generated index data to be displayed within one of the keys N1 to N3 which has been determined to be in contact with the touch pen 7 at step S14.

Hereinafter, an operation of the electronic scheduler 1 for inserting registered data will be described with reference to FIG. 7.

First, the user may press the touch pen 7 on one of the keys N1 to N3 displayed on the liquid crystal display section 6 so as to select and designate the registered data to be cited.

At step S21, the CPU 12 reads the registered data corresponding to the designated key from the citation data storage section 14.

The user may move the touch pen 7, while continuously pressing it down, from the designated key toward a desired position on the liquid crystal display section 6 and release the pressure on the touch pen 7. The CPU 12 may recognize such an operation by the user at, for example, steps S22 and S23 as follows.

At step S22, the CPU 12 determines whether or not the touch pen 7 is in contact with one of the keys N1 to N3. If the touch pen 7 is in contact with the key, the process proceeds to step S23; if the touch pen 7 is not in contact with one of the keys, it is determined whether or not the touch pen 7 is in contact with another key. This determination process can be repeated until (i) it is determined that the touch pen 7 is in contact with one of the keys N1 to N3 (then the process proceeds to step S23), or (ii) it is determined that the touch pen 7 is not in contact with any of the keys N1 to N3 (then the process proceeds to step S25 and is ended). At any time after the process is ended, the process may be resumed at step S21 to wait for a movement of the touch pen 7 again.

At step S23, the CPU 12 determines whether or not the touch pen 7 (which has been moved while being continuously pressed down from the designated key to a desired position on the liquid crystal display section 6) has been lifted off the desired position on the liquid crystal display section 6. If it is determined that the touch pen 7 has been lifted out of contact with the desired position on the liquid crystal display section 6, the control proceeds to step S24. If it is determined that the touch pen 7 has not been lifted out of contact with the desired position on the liquid crystal display section 6, the process return to step S22.

At step S24, the CPU 12 causes the registered data (which has been read at step S21) to be inserted and displayed at the position where the user released the pressure on the touch pen 7 (indicating a position where the user wishes to "cite" the registered data). It will be appreciated that the user can then edit the content displayed at the liquid crystal display section 6.

It should be noted that the following modifications, among many others, are encompassed by the present invention:

(1) Although the citation data storage section 14 according to the above example is provided in the RAM 11, a separate citation data storage section 14 may be provided in addition to the RAM 11.

(2) The number of keys is not limited to 3, but can be 2, 3, or more. Moreover, it is possible to display on the liquid crystal display section 6 selected ones of a plurality of keys accommodated in the data processing device. As a result of limiting the number of keys to be simultaneously displayed, keys corresponding to various functions can be accommodated by the data processing device even in the case where the liquid crystal display section 6 is short on space, thereby efficiently utilizing the liquid crystal display section 6.

(3) In case the data is registered in all of the index keys N1 to N3 displayed on the liquid crystal display section 6, the data processing device may be configured so as to enable selective deletion of the registered data assigned to each key. Alternatively, the data processing device may be configured so that newly assigned registered data overwrites old registered data, thus deleting the old registered data.

As described above, according to the present invention, index data, which may be a part or the whole of the registered data, is displayed within index keys so that a user may use the index keys to cite registered data in a desired position of the input data. The user can simply press on a key to cite the registered data associated therewith.

The user can easily grasp the content of the registered data by merely looking at each key. As a result, the user is less often required to confirm the content of the registered data assigned to each key than in the case of using conventional devices. Thus, the user can easily cite any registered data.

Furthermore, according to the present invention, registered data can be cited by simply consecutively designating two positions on the display section with a touch pen.

Thus, by utilizing the data processing device and the data processing method according to the present invention, it becomes possible to efficiently input data.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A data processing device comprising:
   a display section for displaying input data;
   a selection section for selecting at least a portion of the input data displayed by the display section;
   a generation section for generating index data representing a portion of the selected input data; and
   a storage section for storing the selected input data and the index data,
   wherein the display section further displays a portion of the index data as an indicator key for a user to incorporate the selected input data which is stored in the storage section into a position in the display section as instructed by the user.

2. A data processing device according to claim 1, wherein the display section displays a function key having a region, the index data being displayed within the region.

3. A data processing device according to claim 1, wherein the input data is text data including numbers and letters.

4. A data processing device according to claim 3, wherein the text data includes a string of letters,
   the index data being a first letter to a predetermined letter of the string of letters.

5. A data processing device comprising:
   a display section for displaying input data;
   a touch pen operative to select function from the display section;
   a tablet disposed on the display section, the tablet operative to detect coordinates corresponding to a position of the touch pen relative to the display section;
   a storage section for storing a portion of the input data, the portion of the input data being designated by the touch pen; and
   a generation section for generating index data representing the designated portion of the input data,
   wherein the display section further displays a portion of the index data as an indicator key, the designated portion of the input data stored in the storage section being incorporated into a position in the display section when the indicator key is selected by the touch pen, and wherein the touch pen is operated by a continuous or discrete contact with the display section.

6. A data processing device according to claim 5, wherein the input data includes text data including numbers and letters.

7. A method for processing data comprising:
   displaying input data in a display region of a display section;
   displaying a plurality of keys as indices for selecting at least a portion of the input data to be cited, the plurality of keys being displayed in a region other than the display region of the display section;
   a first determination step for determining whether or not any region of the input data displayed by the display section is designated to be registered;
   a second determination step for determining, in the case where it is determined in the first determination step that a region is designated, whether or not any of the plurality of keys displayed by the display section is designated as a key corresponding to the input data;
   storing, in the case where it is determined in the second determination step that one of the plurality of keys displayed by the display section is designated as a key corresponding to the input data, position data indicating a position of the designated key as associated with registered data displayed in the designated region;
   generating index data based on the registered data stored in the storage section;
   displaying the index data within a frame representing the key corresponding to the input data;
   a third determination step for determining whether or not any of the plurality of keys displayed by the display section is designated to be cited;
   a fourth determination step for determining, in the case where it is determined in the third determination step that one of the plurality of keys is designated, whether or not a position for citing the registered data is designated within the display region of the display section; and inserting, in the case where it is determined in the fourth determination step that a position for citing the registered data is designated, the registered data at the designated position.

8. A method for processing data according to claim 7 further comprising a fifth determination step of determining whether or not one of the plurality of keys and a position for citing the registered data are designated by a user while touching the display section after the third determination step is finished and before the fourth determination step is begun.

9. A method for processing data according to claim 7, wherein the input data includes text data including numbers and letters and image data including figures and diagrams.

* * * * *